US010986836B2

(12) United States Patent
Ogawa et al.

(10) Patent No.: US 10,986,836 B2
(45) Date of Patent: Apr. 27, 2021

(54) MATING DISRUPTION METHOD USING ACETATE-CONTAINING MATING DISRUPTANT

(75) Inventors: Kinya Ogawa, Tokyo (JP); Tatsuya Hojo, Niigata-ken (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 13/491,208

(22) Filed: Jun. 7, 2012

(65) Prior Publication Data

US 2012/0316235 A1    Dec. 13, 2012

(30) Foreign Application Priority Data

Jun. 9, 2011    (JP) .............................. JP2011-129124

(51) Int. Cl.
*A01N 37/02*    (2006.01)
*A01P 7/04*    (2006.01)
*A01N 31/02*    (2006.01)
*A01N 25/00*    (2006.01)

(52) U.S. Cl.
CPC ............. *A01N 31/02* (2013.01); *A01N 25/00* (2013.01)

(58) Field of Classification Search
CPC ................................ A01N 31/02; A01N 25/00
See application file for complete search history.

(56) References Cited

U.S. PATENT DOCUMENTS

| 4,575,458 A | 3/1986 | Steck et al. |
| 5,503,839 A | 4/1996 | Saguchi et al. |
| 5,532,273 A | 7/1996 | Ogawa et al. |
| 2004/0185080 A1 | 9/2004 | Hojo et al. |
| 2004/0197365 A1 | 10/2004 | Fukumoto et al. |
| 2010/0021417 A1 | 1/2010 | Ogawa et al. |

FOREIGN PATENT DOCUMENTS

| EP | 0 537 783 A1 | 4/1993 |
| EP | 1 457 112 A1 | 9/2004 |
| EP | 2 191 717 A2 | 6/2010 |
| JE | 2010-047564 A | 3/2010 |
| JP | H05-201819 A | 8/1993 |
| JP | H06-065007 A | 3/1994 |
| JP | 2004-277310 | 10/2004 |
| JP | 2004-277342 A | 10/2004 |
| WO | WO-01/28327 A1 | 4/2001 |

OTHER PUBLICATIONS

Stelinski, Efficacy and Release Rate of Reservoir Pheromone Dispensers for Simultaneous Mating Disruption of Codling Moth and Oriental Fruit Moth (Lepidoptera: Tertricidae), J. Econ. Entomol., 2009, 102(1), pp. 315-323.*
McGhee, Sprayable Microencapsulated Sex Pheromone Formulations for Mating Disruption of Four Tortricid Species: Effects of Application Height, Rate, Frequency, and Sticker Adjuvant, J. Econ. Entomol., 2007, 100(4), pp. 1360-1369.*
Trimble, Integrated Control of Oriental Fruit Moth (Lepidoptera: Tortricidae) in Peach Orchards Using Insecticide and Mating Disruption, Journal of Economic Entomology, 2001, 94 (2), pp. 476-485.*
Trimble et al., Comparison of a Sprayable Pheromone Formulation and Two Hand-Applied Pheromone Dispensers for Use in the Integrated Control of Oriental Fruit Moth (Lepidoptera: Tortricidae), 2004, Journal of Economic Entomology, 97(2), pp. 482-489.*
Johnson, Organic Fruit Production Needs and Pest Management Practice in the Southeastern United States, 2010, Acta. Hort. 873, pp. 37-44.*
Peterson, Insect Repellents—Past, Present and Future, Pesticide Outlook, 2001, pp. 154-158 (Year: 2001).*
European Search Report for Application No. EP 12 16 9838, dated May 28, 2013.
Office Action for Japanese Application No. 2012-131925 dated Mar. 3, 2015.
Aselage, John et al., *From IPM to organic and sustainable agriculture*, Integrated Pest Management, pp. 489-505 (2009).

* cited by examiner

*Primary Examiner* — Savitha M Rao
*Assistant Examiner* — Andrew P Lee
(74) *Attorney, Agent, or Firm* — Rimon, P.C.

(57) ABSTRACT

Provided is a mating disruption method capable of bringing a stable and effective mating disruption result. Specifically provided is a mating disruption method comprising a step of starting to apply a mating disruptant after mating and oviposition of imagoes of the first generation of an insect pest are substantially over and before imagoes of the second generation of the insect pest emerge, the mating disruptant targeting at least one kind of insect pest which contains one or more kinds of acetates as a natural sex pheromone.

3 Claims, No Drawings

MATING DISRUPTION METHOD USING ACETATE-CONTAINING MATING DISRUPTANT

BACKGROUND OF THE INVENTION

1. Field of the Invention

The present invention relates to a so-called mating disruption method and a mating disruptant used therefor, wherein the former is a pest control method of releasing a sex pheromone substance of an insect pest in a field to disrupt the mating behavior of the insect pest.

2. Description of the Related Art

A mating disruption method is a method in which a sex pheromone is identified from secretions of an insect pest using attractiveness as an index, and the attractant composition is used for mating disruption. The mating disruption method has been expected as a pest control method which has low toxicity and is safe for natural enemies, men and beast as well as the environment. However, a control effect is low against a high population density of insect pests, although pest control is most needed when an insect density is high. Therefore, a mating disruptant has been used for the purpose of increasing the effect of mating disruption on the next generation and beyond by decreasing an insect density of the next generation, even when larvae of the first generation do no harm to farm products in early spring when insect density is relatively low.

Since many of mating disruptants have temperature dependence for release, however, efforts have been made for ensuring the release amount in early spring when temperature is low. On the other hand, since the first generation has a longer emergence period compared to the second generation and beyond, there has been a drawback in that loss of the release amount is large and the release amount after summer becomes low.

Generally, in pest control using a sex pheromone, a sex pheromone is identified from secretions of an insect pest using attractiveness as an index and the composition thereof has been used as a mating disruptant as well as used as an attractant. Since many of alcohols in a sex pheromone composition generally have an attraction blocking effect, the amount of alcohol existing as an impurity in a mating disruptant has been made as small as possible. In a case with a low insect density, a high mating disruption effect for pest control has been obtained. However, the mating disruption effect for pest control is decreased in a case with a high insect density. In contrast, it has been found that the mating disruption effect for pest control is stabilized by increasing the alcohol content in a sex pheromone composition from the first generation with a relatively low insect density or using a mating disruptant with increased alcohol content against the first generation with a high insect density (JP 2010-047564A).

In a case of controlling two or more insect pests having different emergence times simultaneously using a mixed formulation, when a sex pheromone of an insect pest emerging later has a smaller molecular weight or higher vapor pressure, a sex pheromone of an insect pest emerging later is released earlier, resulting in a problem that loss of a sex pheromone of an insect pest emerging later becomes large.

On the other hand, pink bollworm is a major cotton insect pest. When pink bollworm is controlled using a large amount of pesticide such as pyrethroid, natural enemies decrease and a massive outbreak of tobacco budworm occur instead, which is problematic. Therefore, a control method of using a sex pheromone, which is safe for natural enemies, is preferred. However, there has been a problem in that when a sex pheromone is not used during a period of flower bud formation, a pink bollworm density becomes high during a period of cotton seed formation and the control by the sex pheromone is deteriorated. The height of a cotton tree in a period of flower bud formation is only 20 to 30 cm so that even if a sex pheromone dust formulation is used, no control effect is exhibited with the dusting powder just falling down on the ground. Also, in a case where pheromone formulations are placed by hand, it is difficult to place the formulations on cotton trees due to the height of the trees of 20 to 30 cm.

SUMMARY OF THE INVENTION

Thus, the mating disruption effect for pest control is stabilized using a mating disruptant with increased alcohol content, but still a mating disruptant has been used from the first generation. In addition, loss of a part of active components in a mixed mating disruptant is still large when controlling two or more insect pests having different emergence times simultaneously and there has also been problems upon application.

The present invention has been made in view of the above-mentioned circumstances. An object of the present invention is to bring a stable and effective mating disruption result with a small release amount from a mating disruptant, without use of a mating disruptant against the first generation in which a release loss becomes large due to a long emergence period, and even if starting to use a mating disruptant before emergence of imagoes of the second generation with a high insect density in which pest control is most needed. Another object is to reduce a release loss due to different emergence times when controlling two or more insect pests having different emergence times simultaneously.

According to the present invention, provided is a mating disruption method comprising a step of starting to apply a mating disruptant after mating and oviposition of imagoes of the first generation of an insect pest are substantially over and before imagoes of the second generation of the insect pest emerge, the mating disruptant targeting at least one kind of insect pest which comprises one or more kinds of acetates as a natural sex pheromone, the insect pest being selected from the group consisting of tortricid (Leafroller), armyworm (*Spodoptera*), Sesiidae (*Synanthedon*), pink bollworm (*Pectinophora gossypiella*: PBW), European grapevine moth (*Lobesia botrana*: EGVM), tomato pinworm (*Keiferia lycopersicella*: TPW), light brown apple moth (*Epiphyes postvittana*: LBAM), *Grapholita dimorpha* Komai (*Grapholita dimorpha*), apple leafminer (*Phyllonorycter ringoniella*), tomato leafminer (*Tuta absoluta*) and European goat moth (*Cossus cossus*), all of which are substantially free of alcohol or alcohols derived from the acetates as well as oriental fruit moth (*Grapholitha molesta*: OFM) and omnivorous leafroller (*Platynota stultana*), both of which comprises 1.5% by weight or less of alcohol or alcohols derived from the acetates; and the mating disruptant comprising the acetates and the alcohol or alcohols derived from the acetates wherein each amount of the alcohol or alcohols is 1.5 to 10% by weight relatively to each amount of the acetates.

According to the present invention, it has been found that a stable and effective mating disruption result can be obtained with a small release amount from a mating disruptant, without use of the mating disruptant against the first generation in which a release loss becomes large due to a long emergence period, and even if starting to use the mating disruptant from before emergence of imagoes of the second generation with a high insect density in which pest control is most needed. It has also been found that loss of a part of active components in a mixed mating disruptant can be reduced by starting to use the mixed mating disruptant before emergence of imagoes of the second generation of an insect pest having an earlier emergence time when controlling two or more insect pests having different emergence times simultaneously.

Also, in an example of the pink bollworm, the height of cotton trees becomes about 40 to 60 cm before the second generation, which facilitates to place a mating disruptant in a case of placing the mating disruptant by hand. In addition, in a case of using a dust formulation, the amount falling down on the ground is decreased, which leads to a higher control effect.

DETAILED DESCRIPTION OF THE PREFERRED EMBODIMENTS

Insect pests to which the mating disruptant of the present invention is applied are insect pests which comprise one or more kinds of acetates as a natural sex pheromone and which are substantially free of alcohol or alcohols derived from the acetates or comprise 1.5% by weight or less of alcohol or alcohols derived from the acetates.

Alcohol which is derived from acetate is an alcohol as a component of an ester, which alcohol is obtainable by hydrolysis of corresponding acetate. There is no need to obtain an alcohol by actually hydrolyzing an acetate and a commercially available alcohol compound may be used as long as having the same structure. In a case of an insect pest comprising two or more kinds of acetates, alcohol which is derived from acetate means alcohol or alcohols derived from the acetates.

The meaning of substantially free of alcohol is not limited to a case of containing no alcohol, but contains a case where an alcohol may be comprised if the alcohol component has no attraction activity.

The cases where an alcohol is comprised as a component having no attraction activity, for example, may include a case where an alcohol is a precursor of an acetate and the alcohol has remained without becoming the acetate when an acetate sex pheromone is biosynthesized in an insect body, and a case where an alcohol produced by hydrolysis is comprised. Whether the alcohol comprised has an attraction activity or not can be determined as follows. The alcohol comprised is determined to have no attraction activity in a case where no additional effect is observed or an attraction blocking effect is observed when adding alcohol to a pheromone component containing acetate as a main component using a lure. It should be noted that, especially in a case where the alcohol has an attraction blocking effect, the amount of alcohol existing as an impurity has been made as small as possible.

A component having an attraction activity as used herein means an active component which a female of a pest insect has for attracting males and commonly means some or all of the components contained in a natural sex pheromone component.

Among insect pests to which the mating disruptant is applied, insect pests which are substantially free of alcohol or alcohols derived from acetate or acetates are at least one selected from the group consisting of tortricid (Leafroller), armyworm (*Spodoptera*), Sesiidae (*Synanthedon*), pink bollworm (*Pectinophora gossypiella*: PBW), European grapevine moth (*Lobesia botrana*: EGVM), tomato pinworm (*Keiferia lycopersicella*: TPW), light brown apple moth (*Epiphyes postvittana*: LBAM), *Grapholita dimorpha* Komai (*Grapholita dimorpha*), apple leafminer (*Phyllonorycter ringoniella*), tomato leafminer (*Tuta absoluta*) and European goat moth (*Cossus cossus*).

Examples of the tortricid include tea tortrix (*Homona magnanima*), smaller tea tortrix (*Adoxophyes honmai*), apple *Adoxophyes orana* (*Adoxophyes orana fasciata*), three-line leafroller (*Pandemis limitata*), oblique-banded leafroller (*Choristoneura rosaceana*) and false codling moth (*Cryptophlebia leucotreta*).

Examples of the armyworm include tobacco cutworm (*Spodoptera litura*) and cotton leafworm (*Spodoptera littoralis*).

Examples of the Sesiidae include peach tree borer (*Synanthedon exitiosa*), conopia hector (*Synanthedon hector*), apple clear-wing moth (*Synanthedon myopaeformis*), lesser peach tree borer (*Synanthedon pictipes*), currant borer (*Synanthedon tipuliformis*) and leopard moth (*Zeuzera pyrina*).

Examples of the insect pest containing 1.5% by weight or less of alcohol(s) derived from the acetate(s) include oriental fruit moth (*Grapholitha molesta*: OFM) and omnivorous leafroller (*Platynota stultana*).

The mating disruptant at least comprises one or more acetates and alcohol or alcohols derived from the acetates, wherein each of the alcohol or alcohols is comprised in an amount of 1.5 to 10% by weight, preferably 2.0 to 8.0% by weight, more preferably 2.5 to 5.0% by weight relative to each amount of the acetates, provided that in a case of comprising two or more kinds of acetates, it may not be necessary to comprise all of alcohols derived from all of acetates.

Some of conventional mating disruptants may comprise a trace amount of alcohol due to a cause in manufacturing an acetate sex pheromone. However, the alcohol is comprised despite the efforts of decreasing the alcohol content as much as possible and the amount thereof is 1% by weight or less in many cases. The alcohol is not intentionally added, which does not limit the invention.

The acetate to be comprised by the mating disruptant has no limitation imposed on the kind or the number as long as being a sex pheromone. In particular, aliphatic acetate having 10 to 20 carbon atoms is most suitable. Examples thereof include decyl acetate, decenyl acetate, decadienyl acetate, dodecyl acetate, dodecenyl acetate, dodecadienyl acetate, tridecyl acetate, tridecenyl acetate, tetradecyl acetate, tetradecenyl acetate, tetradecadienyl acetate, hexadecyl acetate, hexadecenyl acetate, hexadecadienyl acetate, octadecyl acetate, octadecenyl acetate and octadecadienyl acetate, as well as acetates having three or more double bonds.

Further the sex pheromone composition may comprise a sex pheromone other than the acetate sex pheromone.

The alcohol to be comprised by the mating disruptant may be one obtained by hydrolysis of the acetate or one synthesized by other methods. Specific examples thereof include decyl alcohol, decenyl alcohol, decadienyl alcohol, dodecyl alcohol, dodecenyl alcohol, dodecadienyl alcohol, tridecyl alcohol, tridecenyl alcohol, tetradecyl alcohol, tetradecenyl alcohol, tetradecadienyl alcohol, hexadecyl alcohol, hexadecenyl alcohol, hexadecadienyl alcohol, octadecyl alcohol, octadecenyl alcohol and octadecadienyl alcohol, as well as alcohols having three or more double bonds.

Specifically, the mating disruptant of the present invention comprises at least alcohol(s) derived from the acetate(s) as a main component which targeted insect pests shown in Table 1 below have, but is not limited thereto.

In Table 1, a ratio of each compound is a weight ratio.

According to the mating disruption method of the present invention, it has been found that a stable and effective mating disruption effect can be obtained without use of the mating disruptant against the first generation in which a release loss is large, and even if starting to use the mating disruptant before emergence of imagoes of the insect pest of the second generation with a high insect density in which

TABLE 1

| Insect pests having a substantially alcohol-free natural sex pheromone | | |
|---|---|---|
| 1. tortricid (Leafroller) | | |
| smaller tea tortrix | *Adoxophyes honmai* | Z9-14Ac:Z11-14Ac = 7:4 |
| apple *Adoxophyes orana* | *Adoxophyes orana fasciata* | Z9-14Ac:Z11-14Ac = 13:4 |
| tea tortrix | *Homona magnanima* | Z11-14Ac:Z9-12Ac:11-12Ac = 30:3:1 |
| three-line leafroller | *Pandemis limitata* | Z11-14Ac:Z9-14Ac = 91:9 |
| oblique-banded leafroller | *Choristoneura rosaceana* | Z11-14Ac |
| false codling moth | *Cryptophlebia leucotreta* | E8-12Ac:Z8-12Ac = 90/10 |
| 2. armyworm (*Spodoptera*) | | |
| tobacco cutworm | *Spodoptera litura* | Z9,E11-14Ac:Z9,E12-14Ac = 9:1 |
| cotton leafworm | *Spodoptera littoralis* | Z9,E11-14Ac:Z9,E12-14Ac = 100:1 |
| 3. Sesiidae (*Synanthedon*) | | |
| peach tree borer | *Synanthedon exitiosa* | Z3,Z13-18Ac |
| conopia hector | *Synanthedon hector* | Z3,Z13-18Ac:E3,Z13-18Ac = 1:1 |
| apple clear-wing moth | *Synanthedon myopaeformis* | Z3,Z13-18Ac:Z3,E13-18Ac:E3,Z13-18Ac:E3,E13-18Ac = 95:2:2:1 |
| lesser peach tree borer | *Synanthedon pictipes* | E3,Z13-18Ac |
| currant borer | *Synanthedon tipuliformis* | E2,Z13-18Ac:E3,Z13-18Ac = 100:10 |
| leopard moth | *Zeuzera pyrina* | E2,Z13-18Ac:E2-18Ac = 19:1 |
| 4. pink bollworm (PBW) | *Pectinophora gossypiella* | Z7,Z11-16Ac:Z7,E11-14Ac = 1:1 |
| 5. European grapevine moth (EGVM) | *Lobelia botrana* | E7,Z9-12Ac |
| 6. tomato pinworm (TPW) | *Keiferia lycopersicella* | E4-13Ac |
| 7. light brown apple moth (LBAM) | *Epiphyes postvittana* | E11-14Ac:E9,E11-14Ac = 20:1 |
| 8. *Grapholita dimorpha* Komai | *Grapholita dimorpha* | Z8-12Ac:E8-12Ac = 100:17.4 |
| 9. apple leafminer | *Phyllonorycter ringoniella* | E10-14Ac:E4,E10-14Ac = 6:4 |
| 10. tomato leafminer | *Tuta absoluta* | E3,Z8,Z11-14Ac:E3,Z8-14Ac = 90:10 |
| 11. European goat moth | *Cossus cossus* | Z3-10Ac:Z5-10Ac = 4/1 |
| Insect pests having a natural sex pheromone containing 1.5% by weight or less of alcohol | | |
| 1. oriental fruit moth | *Grapholita molesta* | Z8-12Ac:E8-12Ac:Z8-12OH = 93:6:1 |
| 2. omnivorous leafroller | *Platynota stultana* | E11-14Ac:Z11-14Ac:E11-14OH:Z11-14OH = 88:6:1:0.2 |

In Table 1, E8-12Ac represents E8-dodecenyl acetate, Z8-12Ac represents Z8-dodecenyl acetate, Z8-12OH represents Z8-dodecenyl alcohol, Z9-12Ac represents Z9-dodecenyl acetate, 11-12Ac represents 11-dodecenyl acetate, E7, Z9-12Ac represents E7, Z9-dodecadienyl acetate;

E4-13Ac represents E4-tridecenyl acetate;

Z9-14Ac represents Z9-tetradecenyl acetate, E10-14Ac represents E10-tetradecenyl acetate, E11-14Ac represents E11-tetradecenyl acetate, Z11-14Ac represents Z11-tetradecenyl acetate, E11-14OH represents E11-tetradecenyl alcohol, Z11-14OH represents Z11-tetradecenyl alcohol, E4, E10-14Ac represents E4, E10-tetradecadienyl acetate, E9, E11-14Ac represents E9, E11-tetradecadienyl acetate, Z9, E11-14Ac represents Z9, E11-tetradecadienyl acetate, Z9, E12-14Ac represents Z9, E12-tetradecadienyl acetate;

Z7, Z11-16Ac represents Z7, Z11-hexadecadienyl acetate, Z7, E11-16Ac represents Z7, E11-hexadecadienyl acetate;

E2-18Ac represents E2-octadecenyl acetate, E2, Z13-18Ac represents E2, Z13-octadecadienyl acetate, E3, E13-18Ac represents E3, E13-octadecadienyl acetate, E3, Z13-18Ac represents E3, Z13-octadecadienyl acetate, Z3, E13-18Ac represents Z3, E13-octadecadienyl acetate, and Z3, Z13-18Ac represents Z3, Z13-octadecadienyl acetate.

pest control is most needed. It has been found that using the mating disruptant comprising one or more acetates and each alcohol derived from each of the acetates, wherein each alcohol is comprised in an amount of 1.5 to 10% by weight relative to the amount of each of the acetates, the control effect becomes high even against the second generation having a high insect density and getting to have a high proliferative capacity because of flowers and seeds such as fruits formed, thereby making it possible to omit the use of the mating disruptant against the first generation. Using no mating disruptant against the first generation leads to a reduced loss of a release amount at the first generation which has a relatively long emergence period.

The mating disruption method of the present invention is applied after mating and oviposition of imagoes of the first generation are substantially over and before imagoes of the second generation of an insect pest emerge. An imago of the second generation of an insect pest as used herein means an imago which is grown via a hatched larva from an egg laid by an imago of the first generation which starts mating behavior in spring after overwintering in a form of a larva, pupa or imago. The meaning of after mating and oviposition of imagoes of the first generation are substantially over and before imagoes of the second generation of an insect pest emerge is a period when mating and oviposition of imagoes of the first generation have substantially terminated and imagoes of the second generation have not emerged yet. The actual placement of the mating disruptant is carried out about 1 to 2 weeks before an estimated emergence day of females of the second generation which can mate.

The mating disruption method of the present invention preferably targets two kinds of insect pests having different emergence times and the mating disruptant is applied against an insect pest which emerges earlier after mating and oviposition of imagoes of the first generation are substantially over and before imagoes of the second generation of the insect pest emerge. At that time, the application time is preferably before emergence of imagoes of the first generation of an insect pest which emerges later. For example, an insect pest which emerges earlier is oriental fruit moth, while an insect pest which emerges later is peach twig borer or codling moth.

This can reduce the release loss of the sex pheromone amount due to different emergence times when controlling two or more insect pests having different emergence times simultaneously.

In a case of targeting two or more insect pests having different emergence times, control against the first generation of one insect pest and the second generation of the other insect pest can be carried out simultaneously. In a case of controlling two or more insect pests having different emergence times simultaneously using a mixed formulation, when an insect pest emerging later has a sex pheromone of a smaller molecular weight, a sex pheromone of a smaller molecular weight is released earlier, resulting in a problem that loss of a sex pheromone of an insect pest emerging later becomes large. In a case of oriental fruit moth and peach twig borer, both of which are insect pests of peach, for example, a sex pheromone of oriental fruit moth is an acetate of an unsaturated alcohol having 12 carbon atoms, whereas a sex pheromone of peach twig borer is a combination of an unsaturated alcohol having 10 carbon atoms and an acetate thereof. Therefore, in a case of controlling these insect pests simultaneously, when a mixed formulation is applied before emergence of imagoes of the first generation of oriental fruit moth, one-fourth or more of a sex pheromone for peach twig borer emerging later is lost before emergence of peach twig borer, which is problematic.

In order to solve the problem, the following control method of controlling both insect pests simultaneously is used: the amount of an alcohol derived from a natural acetate sex pheromone which oriental fruit moth has is increased from a commonly contained amount of 1.0% by weight to 1.5% by weight or more, preferably 2.5 to 5.0% by weight, and the mating disruptant is applied before emergence of imagoes of the first generation of peach twig borer and after mating and oviposition of imagoes of the first generation are substantially over and before imagoes of the second generation of oriental fruit moth emerge (in the middle to end of May), thereby minimizing a release loss of the sex pheromone amount. In this case, although the alcohol works as an attractive component for peach twig borer, peach twig borer is not a targeted insect pest for alcohol addition in the invention but just the other insect pest.

Similarly, in a case of controlling codling moth which is an apple insect pest and whose imagoes of the first generation emerges from the middle to end of May, and oriental fruit moth simultaneously, the application of the mating disruptant before emergence of imagoes of the first generation of codling moth and after mating and oviposition of imagoes of the first generation are substantially over and before imagoes of the second generation of oriental fruit moth emerge minimizes a release loss of the sex pheromone amount, which enables control of both insect pests simultaneously.

The mating disruptant can optionally comprise a stabilizer such as an antioxidant or UV absorber or a colorant in an amount of 20% by weight or less in total other than a sex pheromone substance as appropriate depending on the degree of stability of the sex pheromone substance.

The mating disruptant may be released directly through a spray such as a mechanical spray, or may be provided in any form without limitation as long as the form is a container or a carrier capable of retaining an acetate sex pheromone and an alcohol obtainable by hydrolysis thereof while releasing them gradually. The form of a tube, capsule, ampoule or bag is preferred. A tube form may be the most suitable because it can release the sex pheromone and the like uniformly for a long period of time. The tube having an inner diameter of from 0.5 to 3.0 mm and thickness of from 0.2 to 1.0 mm can keep an appropriate release rate.

The material of the container is preferably a polyolefin polymer. Examples thereof include polyolefins such as polyethylene and polypropylene, and ethylene vinyl acetate copolymer. A container made of such a material can allow a sex pheromone and the like to penetrate therethrough and to be released at an appropriate rate outside the polymer membrane. The material may also be biodegradable polyester or polyvinyl chloride.

The container in the above-mentioned form is not limited to a container having one compartment for enclosing a solution. When the container has two or more compartments, the inner diameters or thicknesses thereof may be different from each other. Further, the mixed solution may be enclosed in at least one compartment among the compartments.

In a container having one or more compartments, an amount of the mating disruptant placed in each compartment may vary depending on a release period, volatility of the sex pheromone substance, affinity with the material of the compartment and the like. The amount of the mating disruptant placed in each compartment may be preferably 50 to 500 mg.

Even if the above-mentioned conditions are satisfied, a substance which requires a special place for handling or a formulation which has an adverse effect on the environment is not preferred.

EXAMPLES

The present invention will now be described with reference to Examples. However, it should not be construed that the invention is limited thereto.

<Preparation of Mating Disruptant>

A polymer container made of a polyethylene tube having a predetermined inner diameter and thickness was prepared by extrusion. Then an intended sex pheromone composition was prepared while adjusting an alcohol content corresponding to the percentage of the acetate content in a sex pheromone. After the resulting solution was poured from one end of the polyethylene tube, both ends of the tube were pressurized while performing high frequency heating for melt seal. The melted portions were cut to obtain a sustained release mating disruptant for a test trial. The mating disruptants thus obtained were placed at equal intervals in a field subjected to pest control so as to release a necessary amount of the sex pheromone substance.

<Percentage of Damaged Fruits and Percentage of Damaged Bunches>

Percentage of damaged fruits or percentage of damaged bunches is an estimation method of a mating disruption effect other than the attraction blocking rate. Percentage of damaged fruits, percentage of damaged bunches or the like is used depending on the kind of a targeted crop.

In a case of fruit trees, used is the percentage of damaged fruits represented by the following equation:

{(the number of damaged fruits)/(the number of fruits examined)}×100.

In particular, in a case of grapes, the percentage of damaged bunches represented by the following equation:

{(the number of damaged bunches)/(the number of bunches examined)}×100, which is one of the criteria for judging the effect.

Examples 1 and 2 and Comparative Examples 1 to 3

For European grapevine moth, fields each having an area of 2 ha were prepared. In Comparative Examples 1 and 2, in Plots 1 and 2, 500 tubes/ha of mating disruptants, each tube filled with 240 mg of E7, Z9-dodecadienyl acetate sex pheromone containing E7, Z9-dodecadienyl alcohol were placed on April 15. In Plot 1 and Plot 2, the amounts of E7, Z9-dodecadienyl alcohol contained were different respectively as shown in Table 2. In Examples 1 and 2, in Plots 3 and 4, the same numbers of predetermined mating disruptants were placed on June 1. Further, in Comparative Example 3, Plot 5 was provided at a site 200 m northeast from the nearest test Plot as a control Plot in which no mating disruptant was placed.

It should be noted that, in a Plot 5 of Comparative Example 3 as an insecticide plot, a chlorpyrifos agent was sprayed once against the second generation, and a chlorpyrifos agent was sprayed once and a BT agent was splayed twice against the third generation. In all of the Plots in which mating disruptants were placed, a BT agent was splayed twice only against the third generation. A pheromone trap was placed in the center area, the number of insect pests trapped was counted once a week, and insect pests were removed with tweezers. In each Plot, five measurement spots were selected, five trees were selected in each spot, four bunches in the top part of each tree were examined and the number of damaged bunches was counted in each generation.

Although insecticides have been improved, the reduced number of spraying insecticides is preferred for the environment. Insecticides are, for example, used for control of an insect pest other than an insect pest targeted by a mating disruptant using a sex pheromone.

TABLE 2

|  |  | Plot | content of alcohol (% by weight) | date of placement | traped | number of damaged Bunches (%) |
|---|---|---|---|---|---|---|
| first gen. | Comp. Ex. 1 | Plot 1 | 0.5 | Apr. 15 | 0 | 3 |
|  | Comp. Ex. 2 | Plot 2 | 1.8 | Apr. 15 | 0 | 0 |
|  | Example 1 | Plot 3 | not placed | — | 75 | 6 |
|  | Example 2 | Plot 4 | not placed | — | 65 | 5 |
|  | Comp. Ex. 3 | Plot 5 | insecticide plot | — | 72 | 7 |
| second gen. | Comp. Ex. 1 | Plot 1 | 0.5 | (Apr. 15) | 1 | 10 |
|  | Comp. Ex. 2 | Plot 2 | 1.8 | (Apr. 15) | 0 | 1 |
|  | Example 1 | Plot 3 | 1.8 | Jun. 1 | 0 | 2 |
|  | Example 2 | Plot 4 | 4.1 | Jun. 1 | 0 | 0 |
|  | Comp. Ex. 3 | Plot 5 | insecticide plot | — | 82 | 29 |
| third gen. | Comp. Ex. 1 | Plot 1 | 0.5 | (Apr. 15) | 2 | 18 |
|  | Comp. Ex. 2 | Plot 2 | 1.8 | (Apr. 15) | 0 | 2 |
|  | Example 1 | Plot 3 | 1.8 | (Jun. 1) | 1 | 3 |
|  | Example 2 | Plot 4 | 4.1 | (Jun. 1) | 0 | 0 |
|  | Comp. Ex. 3 | Plot 5 | insecticide plot | — | 172 | 68 |

In Plots 1 and 2, the mating disruptants were placed from the first generation. As for the mating disruptants having 0.5% by weight of alcohol added, damage became large in the third generation with a high insect density. As for the mating disruptants having 1.8% by weight of alcohol added, damage at the harvest time was low, but loss of a release amount was 19% since the mating disruptant treatment against the first generation was not omitted.

On the other hand, in Plot 3 in which mating disruptants having 1.8% by weight of alcohol added were placed before emergence of imagoes of the second generation, damage at the harvest time was low. In Plot 4 in which mating disruptants having a further increased amount of 4.1% by weight of alcohol added were applied, damage at the harvest time was lower.

It should be noted that, the alcohol content in Table was obtained by calculating a value of {(weight of alcohol)/(weight of acetate)}×100.

Examples 3 and 4 and Comparative Examples 4 to 9

For oriental fruit moth, in a peach field in Australia, a field with a high insect density and a field with a low insect density, each having an area of 6 ha, were divided into three equal parts respectively from east to west. In Comparative Examples 4 and 7, in Plot 2 (a center plot), 500 tubes/ha of mating disruptants, each tube filled with 240 mg of a mixture containing Z/E8-dodecenyl acetate pheromone with a Z:E ratio of 93.1:6.0 and 0.9% by weight of Z/E8-dodecenyl alcohol relative to the amount of the acetate were placed on September 1 as shown in Table 3. In Plots on both sides, mating disruptants containing the acetate with the same Z:E ratio and containing 0.9% by weight (Plot 1 in Comparative Examples 5 and 8) and 3.2% by weight (Plot 3 in Comparative Examples 3 and 4) of Z/E8-dodecenyl alcohol respectively relative to the amount of the acetate, were placed on October 5 without pheromone control against the first generation. A field 100 m apart was used as an insecticide plot (Plot 4 in Comparative Examples 6 and 9) and an azinphos-methyl agent was splayed on September 17, October 15 and 22 in the insecticide plot.

In the center area, ten trees were selected as measurement trees, ten new branches were selected from each tree, and the percentage of withering branches was measured. After the second generation, twenty fruits were examined from each measurement tree respectively and the number of damaged fruits was counted.

TABLE 3

| gen. | density | | plot | content of alcohol (% by weight) | date of placement | Percentage of withering (%) | number of damaged fruits (%) |
|---|---|---|---|---|---|---|---|
| first gen. | low density plot | Comp. Ex. 4 | Plot 2 | 0.9 | Sep. 1 | 1 | — |
| | | Comp. Ex. 5 | Plot 1 | not placed | — | 8 | — |
| | | Example 3 | Plot 3 | not placed | — | 9 | — |
| | | Comp. Ex. 6 | Plot 4 | insecticide plot | — | 6 | — |
| second gen. | low density plot | Comp. Ex. 4 | Plot 2 | 0.9 | (Sep. 1) | 3 | 1.5 |
| | | Comp. Ex. 5 | Plot 1 | 0.9 | Oct. 5 | 10 | 2.0 |
| | | Example 3 | Plot 3 | 3.2 | Oct. 5 | 4 | 0.5 |
| | | Comp. Ex. 6 | Plot 4 | insecticide plot | — | 20 | 2.0 |
| first gen. | high density plot | Comp. EX. 7 | Plot 2 | 0.9 | Sep. 1 | 2 | — |
| | | Comp. Ex. 8 | Plot 1 | not placed | — | 41 | — |
| | | Example 4 | Plot 3 | not placed | — | 46 | — |
| | | Comp. Ex. 9 | Plot 4 | insecticide plot | — | 35 | — |
| second gen. | high density plot | Comp. Ex. 7 | Plot 2 | 0.9 | (Sep. 1) | 16 | 2.0 |
| | | Comp. Ex. 8 | Plot 1 | 0.9 | Oct. 5 | 25 | 3.5 |
| | | Example 4 | Plot 3 | 3.2 | Oct. 5 | 7 | 0.5 |
| | | Comp. Ex. 9 | Plot 4 | insecticide plot | — | 30 | 4.0 |

It is evident from the above results that the mating disruptant treatment against the first generation can be omitted not only in a plot with a low insect density but in a plot with a high insect density by using the mating disruptants containing a predetermined amount of alcohol.

It should be noted that, the alcohol content in Table was obtained by calculating a value of {(weight of alcohol)/(weight of acetate)}×100.

Example 5 and Comparative Examples 10 and 11

A test of a mating disruptant against both oriental fruit moth (OFM) and peach twig borer (PTwB) was conducted. As a pheromone of oriental fruit moth, used was a mixture containing Z/E8-dodecenyl acetate (Z/E8-12Ac) with a Z:E ratio of 94:6 and Z/E8-dodecen-1-ol (Z/E8-12OH) in an amount shown in Table 4 relative to the amount of the acetate. As a sex pheromone of peach twig borer, used was a mixture containing E5-decenyl acetate (E5-10Ac) and E5-decen-1-ol (E5-10OH) in an amount shown in Table 4 relative to the amount of the acetate.

Twin tubes were used for a mating disruptant. One compartment was filled with 240 mg of a pheromone of oriental fruit moth and the other was filled with 320 mg of a pheromone of peach twig borer.

TABLE 4

| mating disruptant | content of alcohol for oriental fruit moth (OFM) (% by weight) | content of alcohol for peach twig borer (PTwB) (% by weight) |
|---|---|---|
| low-alcohol disruptant | 1.0 | 5.2 |
| high-alcohol disruptant | 3.6 | 5.2 |
| amount filled | 240 mg/tube | 320 mg/tube |

A slender field of 6 ha was divided into three equal parts: Field A, Field B and Field C. In Comparative Example 10, in the center field (Filed B), 500 tubes/ha of low-alcohol mating disruptants were applied on March 25. In Example 5 and Comparative Example 11, high-alcohol and low-alcohol mating disruptants were applied in Fields A and C, respectively, on May 10.

In a center area of each fields, four ridges: Ridges 1, 3, 7 and 9 were selected and five measurement trees were selected every other tree starting at a point 50 m away from the edge of each ridge to select 20 measurement trees in total. On May 25 and June 30, ten ends of branches of each measurement tree were selected and examined, and the number of withering branches was counted. Also on Jun 30, ten fruits of each measurement tree were selected and examined, and the number of damaged fruits was counted. Damaged fruits were cut out and checked for damage caused by insect pests. In addition, on July 26, the number of damaged fruits was counted similarly. The result is shown in Table 5.

It should be noted that, the alcohol content in Table was obtained by calculating a value of {(weight of alcohol)/(weight of acetate)}×100.

TABLE 5

| date of measurement | damage | | insect pest | Example 5 Field A (high-alcohol disruptant) | Comp. Ex. 10 Field B (low-alcohol disruptant) | Comp. Ex. 11 Field C (low-alcohol disruptant) |
|---|---|---|---|---|---|---|
| date of placement | | | | May 10 | Mar. 25 | May 10 |
| damage | May 25 | % of withering (%) | OFM | 19 | 1.5 | 29 |
| | Jun. 30 | % of withering (%) | PTwB | 3.0 | 2.0 | 2.5 |

TABLE 5-continued

| date of measurement | insect damage | insect pest | Example 5 Field A (high-alcohol disruptant) | Comp. Ex. 10 Field B (low-alcohol disruptant) | Comp. Ex. 11 Field C (low-alcohol disruptant) |
|---|---|---|---|---|---|
| Jun. 30 | percentage of damaged fruits | OFM | 1 | 0 | 3.5 |
|  |  | PTwB | 0 | 0 | 0 |
|  | (%) | total | 1 | 0 | 3.5 |
| Jul. 26 | percentage of damaged fruits | OFM | 0.5 | 1.5 | 5.5 |
|  |  | PTwB | 1 | 2.5 | 1.5 |
|  | (%) | total | 1.5 | 3.0 | 7.0 |

In a case where low-alcohol mating disruptants were placed on May 10, oriental fruit moth of the first generation had proliferated and the second generation started with a high insect density. Therefore, control against oriental fruit moth of the second generation and beyond may not have been sufficient (Field C). Also it is considered that in Field B, 24% by weight of a sex pheromone, E5-decenyl acetate, of peach twig borer emerging later was lost before emergence of the insect pest so that the influence of a gradually decreased release amount of the pheromone after the second generation (July 26) was shown. A high insect density in Field C may have affected the great damage caused by oriental fruit moth to some extent.

On the other hand, in any case, the possibility of reducing control against the first generation of oriental fruit moth is shown, as long as oriental fruit moth of the first generation does not have an extremely high insect density. In that case, a pheromone of peach twig borer is not lost early in the season so that a good control effect of peach twig borer is obtained. It is also considered that when an insect density of oriental fruit moth is high, the amount of pheromone filled is increased or the number of tubes is increased, in anticipation of loss early in the season of peach twig borer.

It should be noted that in general the percentage of withering branches is described as a criterion of an insect density and the effect of an invention is judged by the percentage of damaged fruits.

Example 6 and Comparative Examples 12 to 14

For lesser peach tree borer, a field of 4.2 ha was divided into three equal parts. In Comparative Example 12, in central Plot 2, mating disruptants containing 0.5% by weight of alcohol relative to the amount of acetate were applied on April 25 (before emergence of imagoes of the first generation) as shown in Table 6. In Comparative Example 13, in Plot 1, mating disruptants containing 0.5% by weight of alcohol were applied on May 25 (before emergence of imagoes of the second generation). In Example 6, in Plot 3, mating disruptants containing 2.8% by weight of alcohol were applied on May 25. In Comparative Example 14, Plot 4 is an insecticide plot and Permethrin was sprayed on May 15 and June 10. As a sex pheromone of lesser peach tree borer, used was a mixture of E3, Z13-octadecadienyl acetate and Z3, Z13-octadecadienyl acetate with a 67:33% by weight ratio as acetate. In each Plot, 500 tubes/ha of mating disruptants, each tube filled with 50 mg of a mixture added alcohols thereof in an amount shown in Table 6 therein were applied.

TABLE 6

|  | Comp. Ex. 12 | Comp. Ex. 13 | Example 6 | Comp. Ex. 14 |
|---|---|---|---|---|
| plot | Plot 2 | Plot 1 | Plot 3 | Plot 4 |
| date of placement | Apr. 25 | May 25 | May 25 | — |
| alcohol content of Z3,Z13-18OH (% by weight) | 0.5 | 0.5 | 2.8 | 0 |
| alcohol content of E3,Z13-18OH (% by weight) | 1.0 | 1.0 | 3.0 | 0 |
| amount of sex pheromone (mg/tube) | 50 | 50 | 50 | insecticide |
| number of insecticide applications (times) | 2 | 2 | 2 | 4 |

In each test Plot, two traps were placed and lures were exchanged every month. The number of insect pests trapped was counted every ten days, and insect pests trapped were removed with tweezers. The results are shown in Table 7. Also, 240 measurement trees were selected in each Plot and the number of cast-off skins was counted on the 25th of each month and removed. The results are shown in Table 8.

TABLE 7

| date of measurement | Comp. Ex. 12 Plot 2 (/trap) | Comp. Ex. 13 Plot 1 (/trap) | Example 6 Plot 3 (/tap) | Comp. Ex. 14 Plot 4 (/trap) |
|---|---|---|---|---|
| May 10 | 0 | 3 | 2.5 | 3.5 |
| May 20 | 0 | 13.5 | 14 | 18 |
| May 31 | 0 | 2.5 | 2 | 6.5 |
| Jun. 10 | 0 | 0 | 1.5 | 25 |
| Jun. 20 | 0 | 0 | 0 | 3 |
| Jun. 30 | 0 | 0 | 0 | 0 |
| Jul. 10 | 0 | 0 | 0 | 0 |
| Jul. 20 | 0 | 0 | 0 | 0 |
| Jul. 31 | 0 | 0 | 0 | 2.5 |
| Aug. 10 | 0 | 0 | 0 | 1 |
| Aug. 20 | 2.5 | 0 | 0 | 24 |
| Aug.31 | 0 | 0 | 0 | 12 |
| Sep. 10 | 0 | 0 | 0 | 7.5 |
| Sep. 20 | 0 | 0 | 0 | 0 |

TABLE 8

| date of measurement | Comp. Ex. 12 Plot 2 (/tree) | Comp. Ex. 13 Plot 1 (/tree) | Example 6 Plot 3 (/tree) | Comp. Ex. 14 Plot 4 (/tree) |
|---|---|---|---|---|
| May 25 | (2.1)* | (2.5)* | (2.9)* | (2.5)* |
| Jun. 25 | (2.5)* | (2.5)* | (3.3)* | (2.1)* |
| Jul. 25 | 0.4 | 1.3 | 1.3 | 1.3 |

TABLE 8-continued

| date of measurement | Comp. Ex. 12 Plot 2 (/tree) | Comp. Ex. 13 Plot 1 (/tree) | Example 6 Plot 3 (/tree) | Comp. Ex. 14 Plot 4 (/tree) |
|---|---|---|---|---|
| Aug. 25 | 1.3 | 1.7 | 0 | 2.5 |
| Sep. 25 | 0 | 0.8 | 0 | 1.9 |

*The number in a parenthesis indicates the result of mating in the previous year.

In Plot 1 in which a pheromone agent was placed early in the season, effective results were obtained all through the season. In Plot 2 in which the placement was delayed, however, damage could not be suppressed although the number of insect pests trapped was small. On the other hand, in Plot 3 in which mating disruptants containing a large amount of alcohol were applied, damage was also able to be suppressed.

The invention claimed is:

1. A mating disruption method comprising a step of starting to apply a mating disruptant after mating and oviposition of imagoes of the first generation of an insect pest are substantially over and before imagoes of the second generation of the insect pest emerge, with neither the use of the mating disruptant nor the use of an insecticide against the first generation, the mating disruptant targeting at least one kind of insect pest which comprises one or more kinds of acetates as a natural sex pheromone, the insect pest being selected from the group consisting of lesser peach tree borer (*Synanthedon pictipes*), and European grapevine moth (*Lobesia botrana*: EGVM), both of which are substantially free of alcohol or alcohols derived from the acetates as well as oriental fruit moth (*Grapholitha molesta*: OFM) which comprises 1.5% by weight or less of alcohol or alcohols derived from the acetates; and the mating disruptant comprising the acetates and the alcohol or alcohols derived from the acetates wherein each amount of the alcohol or alcohols is 1.5 to 10% by weight relative to each amount of the acetates.

2. The mating disruption method according to claim 1, wherein the insect pest is an insect pest which emerges earlier between two kinds of insect pests having different emergence times, and the step of starting to apply is carried out after mating and oviposition of imagoes of the first generation are substantially over and before imagoes of the second generation of the insect pest emerge, and before emergence of the first generation of an insect pest which emerges later between the two kinds of insect pests.

3. The mating disruption method according to claim 2, wherein the insect pest which emerges earlier is oriental fruit moth and the insect pest which emerges later is peach twig borer or codling moth.

* * * * *